United States Patent [19]
Procter et al.

[11] 3,792,285
[45] Feb. 12, 1974

[54] ELECTRONIC CIRCUIT INSTALLATIONS
[75] Inventors: Brian John Procter, Stevenage;
Colin Sidney Osborne, Sandy;
Ignacy Krajewski, Hitchin, all of England
[73] Assignee: International Computers Limited, London, England
[22] Filed: Aug. 23, 1972
[21] Appl. No.: 283,075

[30] Foreign Application Priority Data
Aug. 25, 1971 Great Britain................... 39,869/71
Mar. 28, 1972 Great Britain................... 14,405/72

[52] U.S. Cl................................. 307/38, 307/147
[51] Int. Cl............................................. H02j 3/14
[58] Field of Search... 307/38, 39, 40, 41, 112, 147, 307/149

[56] References Cited
UNITED STATES PATENTS
3,551,689  12/1970  Zanoni............................... 307/38
3,697,767  10/1972  Fioravanti......................... 307/38

Primary Examiner—Herman J. Hohauser

[57] ABSTRACT

The circuits of a multicircuit installation using common power feeders, are tested by being electrically isolated from the other circuits, individually activated and tested.

4 Claims, 4 Drawing Figures

ELECTRONIC CIRCUIT INSTALLATIONS

BACKGROUND OF THE INVENTION

This invention relates to electronic circuit installations and to methods of and apparatus for testing the operational condition of such installations.

It is known to provide a large number of separate circuits on a common mounting board, such cirsuits can be for example, monolithic integrated circuits; integrated circuit chips, and hybrid circuit units. For purposes of convenience in connecting such circuits to power supplies necessary to operate the circuits the supply lines of individual circuits on the board are joined to associated main supply lines which are brought out at some convenient point on the board, for example, at board fingers.

With this arrangement wherever a power source is connected to the main supply lines all of the circuit elements are activated. For normal operational conditions the simultaneous activation of a large number (for example 70 or more) of individual circuits each having a considerable number of contact pairs (for example 14 to 16), may well be an important operational advantage. However, it has been found that for the purposes of testing such circuits it is not always desirable to have to energise all the circuits in order to be able to test one or more selected circuits. In certain situations the simultaneous activation may well impede the testing operations.

It is an object of the present invention to facilitate the testing of electronic installations and/or equipment embodying a large number of individual circuits.

SUMMARIES OF THE INVENTION

Broadly, according to a first aspect of the invention, a method of testing an electronic installation embodying interaction of individual circuits each having power supply connections joined to one or more common power supply lines, includes electrically isolating a circuit to be tested from the remainder of said circuits, individually activating the circuit to be tested, and carrying out a test sequence on the selected circuit.

The electrical isolation of the circuit may be achieved individually for each circuit, or may exist for some or all of the circuits until they are jointly connected by suitable means.

Preferably, an electronic circuit installation is represented by a circuit board for a plurality of integrated circuits and any other necessary components.

According to a second aspect of the invention an electronic circuit installation including a plurality of individual circuit elements each having associated power supply connections, joined to one or more power supply lines associated with said circuits, said lines being arranged for connection to a power supply; and circuit isolating means, there being one such isolating means for each said circuit or group of selected circuits, the arrangement being such that each circuit, or group of selected circuits, can be activated independently of other circuits of the installation in order to enable testing of the activated circuit or circuits of a selected group.

The circuit isolating means may include isolating diodes each connected in one of the supply lines of each circuit, or said group of circuits, the arrangement being such that for operation of the installation power applied to the feeder lines will be fed to the circuits, and such that by applying power to said power lines of the circuit or group of circuits to be tested electrically downstream of the associated isolating means the selected circuit or circuit group can be activated, without activating the remaining circuits of the installation.

Alternatively, the isolating means may include a mechanical arrangement such as a shorting element, switch or the like. Individual switches or other mechanically operable means may be connected in series with one or more of the supply lines of the associated circuit or circuit group, or a common shorting element may be used for some or all of the circuits.

BRIEF DESCRIPTION OF THE DRAWING

For a better understanding of the invention reference will now be made to the accompanying drawing, in which.

DESCRIPTION OF THE PREFERRED EMBODIMENTS

Figure 1:
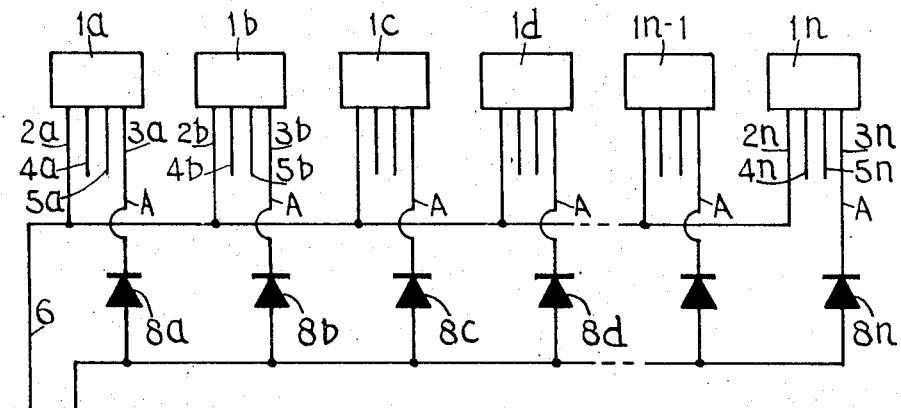
FIG. 1 illustrates diagrammatically an electronic circuit installation incorporating diodes to embody the present invention.

In the figure the references $1a$; $1b$; $1c$; $1d$ .... $1n-1$; $1n$ indicate schematically a plurality of electronic circuits. Each circuit has a plurality of supply or signal lines. In the drawing only four such lines are indicated these being identified for each circuit by the references 2, 3, 4 and 5 together with corresponding suffixes. The lines $2a$ $2b$ .... $2n$ are connected directly to a common power supply feeder line 6.

The lines $3a$ $3b$ .... $3n$ are each connected to a common feeder line 7, by way of circuit isolating means. In the drawing these are shown as unidirectional conductive devices such as diodes $8a$; $8b$; $8c$; $8d$ .... $8n$. The devices $8a$ .... $8n$ allow current to flow from the line 7 to the circuits $1a$ .... $1n$ but not in the reverse direction.

For the purposes of testing the circuits a circuit to be tested is activated by applying a activating power supply to the lines 6 and to the line $3a$ of the relevant circuit at a point electrically downstream of the associated device 8, for example, at point A. It will be seen that the application of current to the line 6 and to a selected circuit at point A will only activate the selected circuit 1, since the device 8 associated with the circuit 1 being tested will prevent the current from activating any of the remaining circuits $1 \ldots 1n$.

In a modified arrangement the isolating diode can be replaced by mechanical arrangements such as switches, or line shorting elements, the mechanical arrangement being connected in series with the current supply lines of associated circuits.

In a further arrangement the device 8 can be a resistance which is very much greater than the magnitude of a series resistance included in the line 7. The lines 6 and 7 can be joined and a voltage supply applied to part A of a circuit to be tested. As a result of the resistance arrangement mentioned above the remaining circuits will be isolated from the circuit to be tested since the voltage at the said other circuits with regard to the joined lines 6 and 7 is too small to activate the said remaining circuits.

It will be understood that the isolating devices can be reduced in number by using a single device in conjunction with a group of the circuits, for example two or more.

In this arrangement it will be appreciated that although more than one circuit will be activated during a testing procedure, the number activated is much less than the total number on the circuit mounting board.

Figure 2:
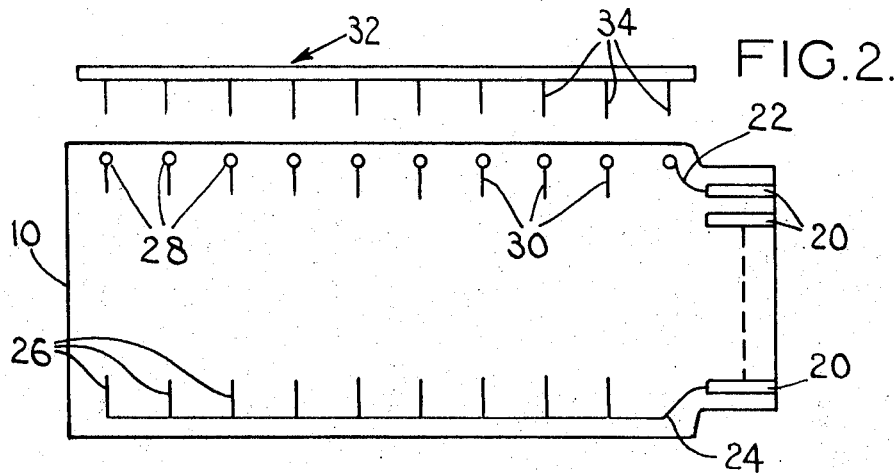
FIG. 2 illustrates diagrammatically a multi-layer circuit board and an associated common shorting element.

An arrangement utilising a common shorting element is shown diagrammatically in FIG. 2 for which the electronic installation is a multilayer circuit board that resembles those of our copending British application no. 14401/72 and serves to mount and interconnect a plurality of integrated circuits and any other necessary circuit components, such as decoupling capacitors. The integrated circuits (not shown) are mounted at predetermined positions on one side of the board 10, usually by connecting, e.g. soldering, their terminal leads into plated-through holes in the board. The thus occupied mounting holes connect with conductive tracks for power and other signal supply as well as circuit interconnection purposes. As disclosed in the above-mentioned copending application, at least the circuit interconnection tracks are connectedly associated with separate conductive portions, such as pads, on the reverse side of the board 10, which serve to give access to such tracks individually by conductive probes, for example of a "bed-of-nails" tester.

The board 10 has a plurality of terminal stakes 20 at one end which may fit into a back plane and serve to supply power and any other signals that may be required by the installation. The two end-most stakes are assumed to provide different power supply voltages and conductive tracks 22, 24 are shown extending therefrom, though both would normally not be visible at the upper surface of the board as multilayer board structures generally provide for them at different layers of the structure. The lower track 24 is shown to have a plurality of branches 26 and each of these branches is assumed to supply a different circuit component, in this case specifically an integrated circuit. The upper track, however, is shown extending to one of a series of aligned plated-through holes 28. Each of the others of these plated-through holes 28 is shown terminating a separate conductive track 30 each intended to supply the upper track supply voltage to a different integrated circuit. This supply can only take place when the holes 28 are shorted together by a comb-like metal shorting element 32 having teeth 34 in register with and dimensioned to enter the holes 28 where they can be fixed in electrical contact, for example by soldering.

Clearly, with the shorting element 32 in position in the holes 28 both supply voltage levels can be applied to all of the integrated circuits. Equally, with the shorting element 32 dismounted from the holes 28, the upper track voltage can be applied individually to the integrated circuit supply tracks 30 as contact is made with the plated-through holes 28. This may be done by probes of a "bed-of-nails" test rig, though it might then be preferable to provide each hole 28/track 30 pair with a standard conductive contact portion, e.g. pad, in electrical contact therewith and available for surface contact as disclosed for interconnection tracks in our copending application, mentioned above.

That application also shows an alternative shorting element for contacting conductive pads rather than mounting holes, and, further, shows the shorting element extending across the board in front of the terminal stakes. Other structural and mounting alternatives and combinations thereof are clearly possible, for example, for non-aligned access points to the tracks 30.

The shorting element 32 may be formed from sheet metal by stamping out the comb teeth 34 and folding the remainder to a desired profile or appropriate configuration.

Figures 3, 4:
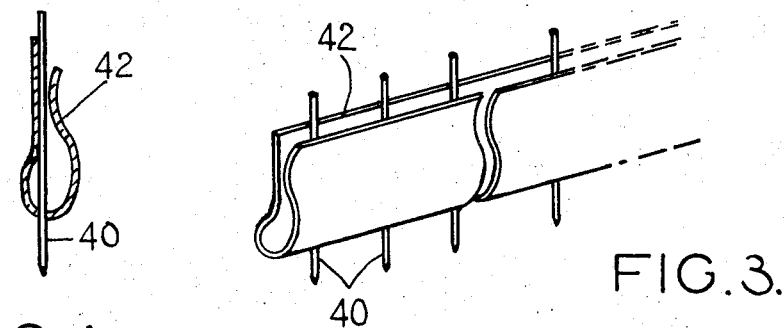
FIGS. 3 and 4 illustrate a preferred structure of a detail of the common shorting element of FIG. 2.

The preferred structure is shown in FIGS. 3 and 4 as comprising individual pins 40 corresponding to the teeth 34 and a common elongated clip 42 of folded resilient conductive material that is pierced at intervals prior to folding so as to be able to accommodate the pins 40. In soldering the pins 40 into their mounting holes the clip and pins may also be consolidated. Alternatively, it would be advantageous to be able, at any time, to remove the clip from the pins without melting out solder, though care would have to be exercised not to deform the pins during any test with the pins still soldered in.

The use of a common shorting element rather than discrete elements switches or unidirectional devices has advantages from the point of view of structural expense and/or complexity. However, the use of solid state diodes would allow integrated circuit structures to incorporate such devices integral therewith allowing access from a lead thereof to achieve the effects indicated for FIG. 1.

We claim:

1. An electronic circuit installation including a plurality of individual circuit elements each having at least first and second power input connections; a test point joined to each second power input connection; at least first and second power lines arranged for connection to a power supply, the first power line being connected directly to the first power input connection of each circuit element; a different diode for each separate circuit element, the diodes respectively being connected between the second power line and the circuit elements and each being arranged to allow power to be fed to the circuits for operation of the installation, the arrangement being such that power applied directly to any one of said test points in the absence of the application of power to said second power line activates only the circuit element associated with that point, the associated diode preventing activation of the remaining circuits of the installation.

2. An electronic circuit installation including a circuit element mounting board; a plurality of individual circuit elements mounted thereon each having at least first and second power supply connections; at least first and second conductive power lines on the board arranged for connection to a power supply, the second power line terminating in an aperture; a plurality of conductive paths on the board communicating one with each of said first power supply connections and connected to said first power line; a further plurality of conductive paths communicating one with each of said second power supply connections, each terminating in a further aperture; and a common shorting element having projections engageable with all of said apertures.

3. An electronic circuit installation as claimed in claim 2, in which the shorting element includes a sheet metal portion from which portion said teeth project, said teeth being integral with said portion.

4. An electronic circuit installation as claimed in claim 2, in which the shorting element includes a plurality of pins providing teeth and a clip of folded resilient electrically conductive material, the clip being pierced at intervals along the length thereof to receive the pins.

* * * * *